Aug. 15, 1939.  I. G. FOWLER ET AL  2,169,687
ELECTRICAL GLASS CUTTING APPARATUS
Filed Nov. 4, 1935   2 Sheets-Sheet 1
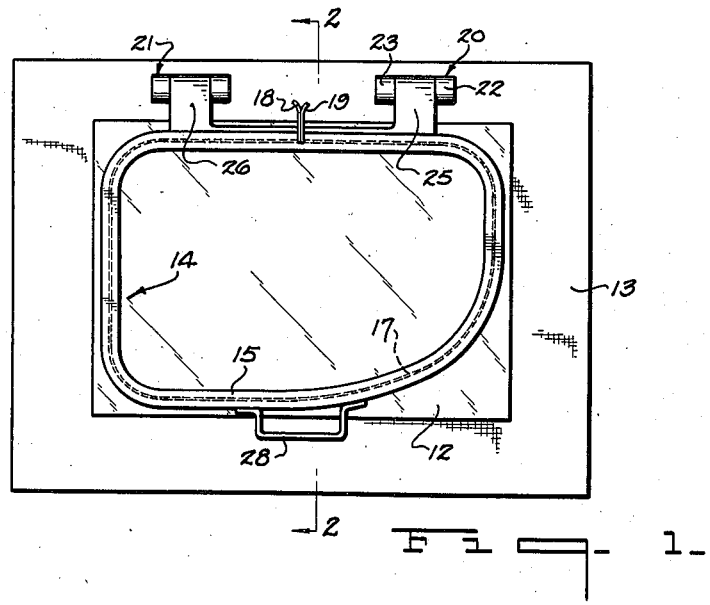
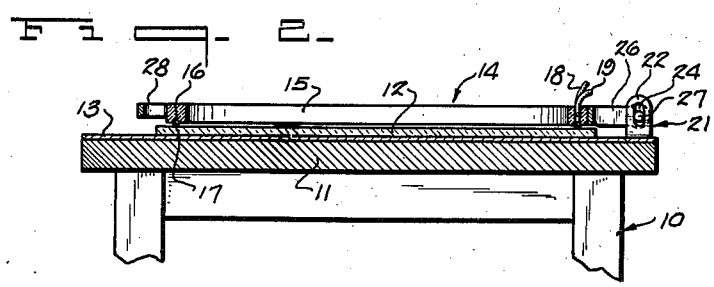
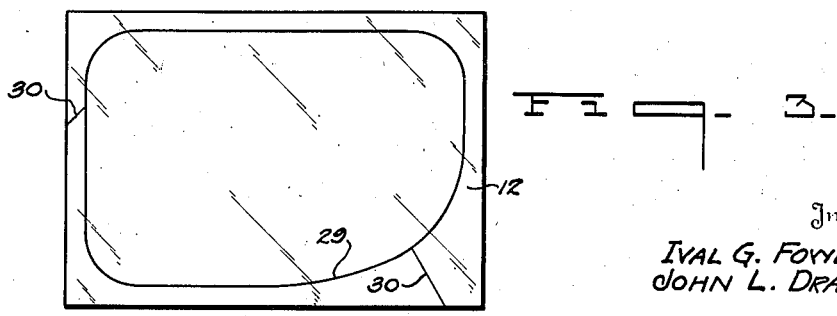
Inventors
IVAL G. FOWLER.
JOHN L. DRAKE.
By Frank Fraser
Attorney

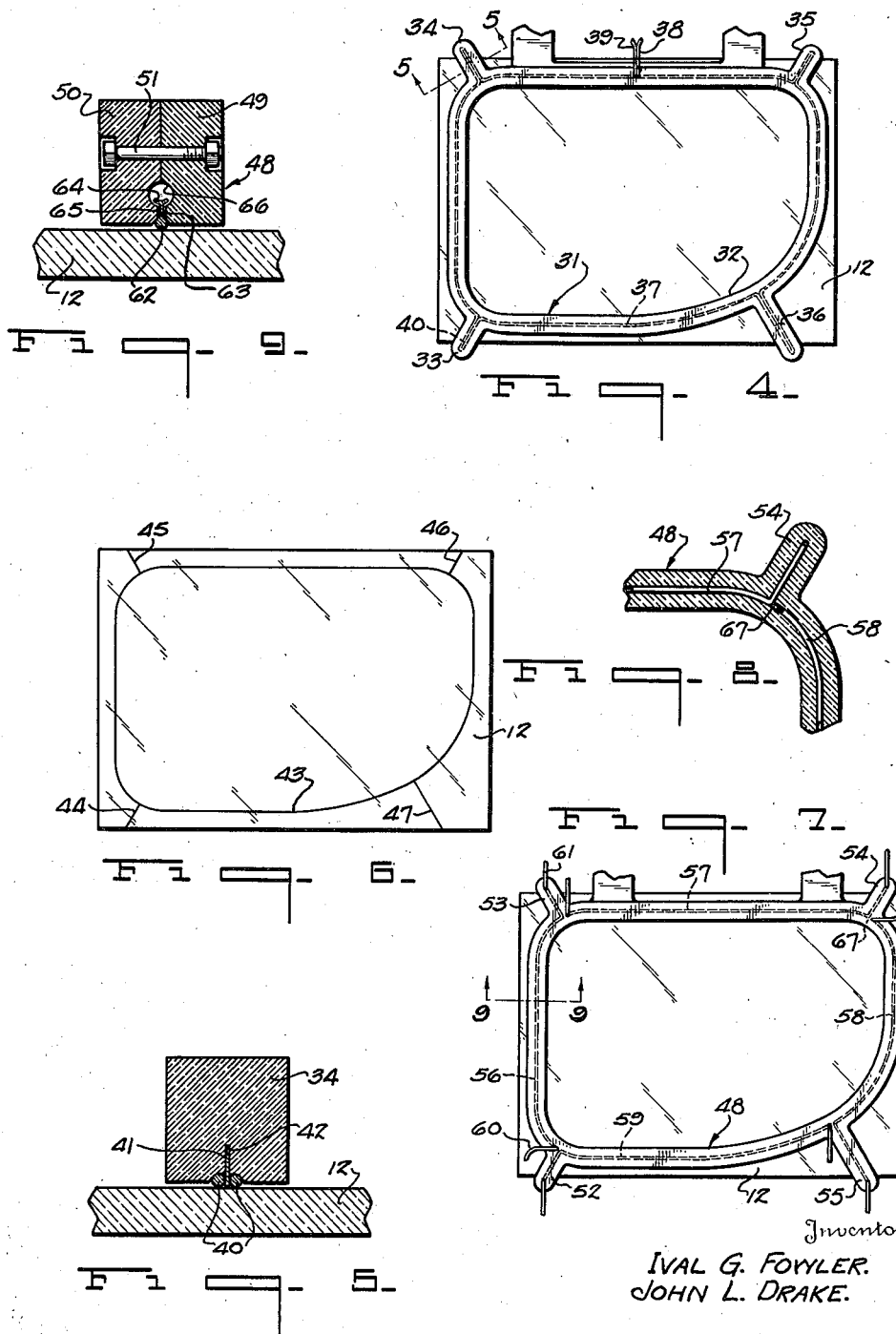

Patented Aug. 15, 1939

2,169,687

UNITED STATES PATENT OFFICE 2,169,687

ELECTRICAL GLASS CUTTING APPARATUS

Ival G. Fowler and John L. Drake, Toledo, Ohio, assignors to Libbey-Owens-Ford Glass Company, Toledo, Ohio, a corporation of Ohio Application November 4, 1935, Serial No. 48,188

8 Claims. (Cl. 49—50)

The present invention relates to apparatus for use in the severing of materials such as sheets or plates of glass or the like.

It is an aim of the invention to provide improved apparatus for facilitating the severing of glass sheets along a defined line of cleavage by the use of electricity and particularly in the cutting out of forms or shapes of various sizes and/or contours.

Another important object of the invention is the provision of electrical apparatus of dependable, relatively simple construction by the use of which irregular or special shapes or forms may be cut from glass sheets in a convenient and economical manner.

Another object of the invention is the provision of novel electrical apparatus for the template cutting of glass sheets and which, while particularly adapted for use in the cutting of sheets of relatively great thickness, may also be used for the cutting of relatively thin sheets.

Other objects and advantages of the invention will become apparent during the course of the following description when taken in connection with the accompanying drawings.

In the drawings wherein like numerals are employed to designate like parts throughout the same, Fig. 1 is a plan view of an apparatus provided by the present invention, Fig. 2 is a sectional view taken substantially on line 2—2 of Fig. 1, Fig. 3 is a view showing the manner in which the glass sheet is cut, Fig. 4 is a plan view of a modified apparatus embodying the principle of the present invention, Fig. 5 is a detail sectional view taken substantially on line 5—5 of Fig. 4, Fig. 6 is a view showing the manner in which a sheet of glass is cut when using the apparatus of Fig. 4, Fig. 7 is a plan view of another form of apparatus, Fig. 8 is a detail sectional view thereof, and Fig. 9 is a detail sectional view taken subtially on line 9—9 of Fig. 7.

Referring now to the drawings and particularly to Figs. 1 to 3, there is provided a table 10 having a flat stationary top 11 for supporting the glass sheet 12 to be cut, the upper surface of the table top 11 being preferably covered with a pad 13 of felt or some other suitable material to prevent scratching of the glass sheet.

The means herein provided for facilitating the cutting of the glass sheet is mounted above the table 10 and is designated in its entirety by the numeral 14. This means comprises a template frame 15 of insulating material and preferably of the same shape and approximately the same size as the form or light to be cut from the glass sheet. The template frame 15 is rectangular in cross section as shown in Fig. 2, and has formed in the bottom surface thereof a continuous groove or channel 16. Fitted within this channel is an electrically heated element 17 which preferably consists of a relatively thin resistance wire. This wire projects slightly beyond the bottom face of the template frame and the opposite ends thereof may be suitably connected by the line wires 18 and 19 with a suitable source of electrical energy. A single continuous resistance wire 17 is preferably used and is, arranged to form a substantially closed loop of the same size and contour as the form or light to be cut from the glass sheet 12, the said wire serving, as will be more clearly here'nafter apparent, to heat the said sheet along a defined line of cleavage.

The template 14 is preferably hinged to the table 10 and to this end there is carried upon the top 11 of said table a pair of hinge members 20 and 21, each being formed with spaced upstanding ears 22 and 23 having vertical slots 24 therein. Secured to the template are the complemental hinge members 25 and 26 which are received between the spaced ears 22 and 23 of hinge members 20 and 21 respectively and mounted upon transverse pins 27 operating in the slots 24. With this type of hinge construction, the apparatus can be used with glass sheets of different thicknesses and irrespective of the thickness of the sheet, the template will rest freely and flatly thereon. A handle 28 may be secured to the template to facilitate the raising and lowering thereof.

In practice, the template 14 is first swung upwardly and the glass sheet 12 to be cut laid upon the top 11 of table 10, the said sheet being of a slightly greater length and width than the template. The template is then lowered so that the resistance wire 17 rests upon the upper surface of the glass sheet. An electrical current is then caused to flow through the resistance wire to effect the heating of the glass along the defined line or path of cleavage indicated at 29 in Fig. 3 and which is coincident with the said wire. After the glass has been sufficiently heated, the template is lifted therefrom and the glass sheet cracked along the heated line or path 29.

In cutting relatively thin sheets, the cracking off action may automatically begin before the template is removed from the sheet due to the heating of the glass. However, when cutting relatively thick sheets, it is preferred that the cracking off action be initiated by the operator and this can be done by making one or more lateral cuts 30 (Fig. 3) to the edge of the glass sheet. These cuts are simply score lines made by the operator using any conventional type of hand cutter, and extend from the line of cleavage 29 to the edges of the sheet. The operator can then break the sheet first along the lines 30 whereupon the cracking off action will automatically follow around the heated line 29. The glass broken away from the sheet outwardly of the heated line 29 is of course waste or cullet while the section inwardly of the heated line will be of the shape and size desired. While it is preferred to lower the template upon the glass before heating the resistance wire 17, the said wire may be heated before being brought into contact with the glass if desired.

In Figs. 4 and 5 is illustrated a modified form of apparatus wherein one or more lateral cuts extending to the edges of the sheet may be made simultaneously with the heating of the sheet along the desired line of cleavage, so that the necessity for the operator to make the entering cuts is eliminated. In this embodiment, the template member is designated 31 and comprises a frame 32 of insulating material provided at substantially the four corners thereof with the lateral extensions or projections 33, 34, 35 and 36. Carried by the template frame is the electrically heated element 37 consisting preferably of a single length of resistance wire connected at its opposite ends by the line wires 38 and 39 with a suitable source of electrical energy. The wire 37 is arranged to form a substantially closed loop of the desired contour and is also provided with portions 40 extending outwardly from the loop to the edges of the glass sheet and being carried by the projections 33, 34, 35 and 36 of the template frame. The portions 40 of the resistance wire are bent upon themselves as clearly indicated by the broken lines in Fig. 4, and the parallel portions thereof may be maintained spaced from one another by a strip of insulating material 41 (Fig. 5) inserted within a groove 42 in each lateral projection.

In operation, the template 31 is lowered upon the glass sheet to be cut and sufficient current passed through the resistance wire 37 to effect the heating of the glass to the desired temperature, after which the template is lifted off of the glass and the sheet broken along the heated lines. The heated line of cleavage is indicated at 43 in Fig. 6, while 44, 45, 46 and 47 designate the lines along which the glass is heated by the portions 40 of the wire carried by the projections 33, 34, 35 and 36. These heated lines extend from the line of cleavage to the edges of the sheet and constitute entering cuts along which the glass can be initially broken, after which it can be readily cracked along the line 43.

Although it is not considered necessary in all cases, it may be desirable in certain instances to provide means for taking up any expansion which may occur in the electrically heated element upon heating thereof. One form of apparatus which may be provided for accomplishing this purpose is shown in Figs. 7, 8 and 9. The template frame is here designated by the numeral 48 and consists of two parts 49 and 50 arranged side by side in contacting relation, as shown in Fig. 9, and secured together at a plurality of points by transverse bolts 51. The template frame is also provided at substantially the four corners thereof, with the lateral projections 52, 53, 54 and 55 extending to the edges of the glass sheet.

In this form of the invention, the heating member instead of being in the form of a single length of resistance wire is divided into four relatively short sections 56, 57, 58 and 59 constituting individual heating elements and each extending approximately one-quarter of the distance around the template frame. More particularly, the heating element 56 extends from a point adjacent the lateral projection 52 to the outer end of projection 53, while the heating element 57 extends from a point adjacent the lateral projection 53 to the outer end of projection 54. Likewise, the element 58 extends from adjacent the lateral projection 54 to the outer end of the projection 55, while the element 59 extends from adjacent lateral projection 55 to the outer end of projection 52. Therefore, the four separate heating elements 56, 57, 58 and 59 are arranged in end to end relation and cooperate to form a substantially closed loop having a contour corresponding to that of the sheet to be cut. Each separate heating element is provided at its opposite ends with the lead wires 60 and 61 connected with a suitable source of electrical energy.

Each heating element 56, 57, 58 and 59 comprises, as shown in Fig. 9, a length of relatively thin resistance wire 62 carried at the lower end of a substantially vertical web 63 having formed at its upper end a double flange 64. The vertical web 63 is loosely received within a slot 65 formed between the template frame sections 49 and 50, while the double flange 64 is received within an opening 66 communicating with slot 65. As shown in Figs. 7 and 8, the adjacent ends of adjoining heating elements do not normally contact with one another but are slightly spaced apart as indicated at 67. By normally spacing the heating elements slightly from one another when not in use, they will, upon being heated, be permitted to expand longitudinally whereupon they will engage one another and act to heat the glass sheet along a substantially closed continuous line of cleavage. Except for the differences pointed out above, the operation of this form of the invention is the same as that form of the invention illustrated in Figs. 4, 5 and 6.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. A device for use in the cutting of glass sheets including a supporting surface for the sheet, a template above said supporting surface, and heating means carried by the template comprising a plurality of separate heating elements arranged in end to end relation and cooperating to heat the glass sheet to a relatively high temperature along a substantially closed continuous line of cleavage.

2. A device for use in the cutting of glass sheets including a supporting surface for the sheet, a template above said supporting surface, and heating means carried by the template comprising a plurality of separate heating elements arranged in end to end relation and cooperating to heat the glass sheet to a relatively high temperature along a substantially closed continuous line of cleavage, at least one of said heating elements extending laterally from the line of cleavage to the edge of said sheet.

3. A device for use in the cutting of glass sheets including a supporting surface for the sheet, a template above said supporting surface, and heating means carried by the template comprising a plurality of separate electrically heated elements arranged in end to end relation and normally spaced slightly from one another when not in use, said elements cooperating to form, when in use, a substantially closed loop having a contour corresponding to that of the section to be cut from the glass sheet.

4. A device for use in the cutting of glass sheets including a supporting surface for the sheet, a template above said supporting surface, and heating means carried by the template comprising a plurality of separate electrically heated elements arranged in end to end relation and normally spaced slightly from one another when not in use, said elements cooperating to form, when in use, a substantially closed loop having a contour corresponding to that of the section to be cut from the glass sheet, at least one of said electrically heated elements extending laterally and outwardly from the loop to the edge of said sheet.

5. A device for use in the cutting of glass sheets including a supporting surface for the sheet, a template above said supporting surface, heating means carried by the template arranged to form a substantially closed loop of the same size and contour as the form or light to be cut out from the glass sheet and adapted to contact with said sheet for bringing the same to a relatively high temperature along the desired line of cleavage which is coincident with said heating means, and means engaging the sheet along a line extending laterally from the line of cleavage to the edge of said sheet for heating the said sheet along said line.

6. A device for use in the cutting of glass sheets including a supporting surface for the sheet, a template above said supporting surface, and a heating element carried by the template arranged to form a substantially closed loop of the same size and contour as the form or light to be cut out from the glass sheet and adapted to contact with said sheet for bringing the same to a relatively high temperature along the desired line of cleavage which is coincident with said heating element, a portion of said heating element extending laterally from the line of cleavage to the edge of the glass sheet.

7. A device for use in the cutting of glass sheets including a supporting surface for the sheet, a template above said supporting surface, and an electrically heated element carried by the template arranged to form a substantially closed loop of the same size and contour as the form or light to be cut out from the glass sheet and adapted to contact with said sheet for bringing the same to a relatively high temperature along the desired line of cleavage which is coincident with said electrically heated element, a portion of said electrically heated element extending laterally and outwardly from said loop to the edge of the glass sheet.

8. A device for use in the cutting of glass sheets including a supporting surface for the sheet, a template above said supporting surface provided with an outwardly directed lateral extension, and an electrically heated element carried by the template arranged to form a substantially closed loop of the same size and contour as the form or light to be cut out from the glass sheet and adapted to contact with said sheet for bringing the same to a relatively high temperature along the desired line of cleavage which is coincident with said electrically heated element, a portion of said electrically heated element extending laterally and outwardly from said loop to the edge of the glass sheet and carried by the lateral extension of said template.

IVAL G. FOWLER.
JOHN L. DRAKE.